United States Patent
Lin et al.

(10) Patent No.: US 6,912,022 B2
(45) Date of Patent: Jun. 28, 2005

(54) OPTICAL INTERFERENCE COLOR DISPLAY AND OPTICAL INTERFERENCE MODULATOR

(75) Inventors: Wen-Jian Lin, Hsinchu (TW); Hsiung-Kuang Tsai, Taipei (TW)

(73) Assignee: Prime View International Co., Ltd., Hsinchu (TW)

( * ) Notice: Subject to any disclaimer, the term of this patent is extended or adjusted under 35 U.S.C. 154(b) by 126 days.

(21) Appl. No.: 10/249,244

(22) Filed: Mar. 26, 2003

(65) Prior Publication Data

US 2004/0125282 A1 Jul. 1, 2004

(30) Foreign Application Priority Data

Dec. 27, 2002 (TW) .......................................... 91137638 A

(51) Int. Cl.[7] .......................................... G02F 1/1335
(52) U.S. Cl. ........................ 349/105; 349/106; 359/237
(58) Field of Search ................................ 349/105, 106, 349/86, 104; 359/237, 263, 618, 885, 622; 362/260

(56) References Cited

U.S. PATENT DOCUMENTS 5,142,414 A * 8/1992 Koehler ........................ 359/578
2001/0055208 A1 * 12/2001 Kimura ........................ 362/260

* cited by examiner

Primary Examiner—Tarifur R. Chowdhury
Assistant Examiner—Prasad Akkapeddi
(74) Attorney, Agent, or Firm—Jianq Chyun IP Office

(57) ABSTRACT

An optical interference color display is provided. The optical interference color display comprises a color filtering substrate, a patterned support layer, a plurality of first electrodes, a plurality of optical films and a plurality of second electrodes. The patterned support layer and the first electrodes are positioned on the color filtering substrate with the patterned support layer between the first electrodes. The optical films are positioned on the first electrodes. The second electrodes is positioned over the first electrodes and supported through the patterned support layer such that an air gap with identical thickness is produce between every pair of second electrode and first electrode. Using the color filtering substrate to show color images, air gap between the first electrodes and the second electrodes are identical and hence simplifies the manufacturing process.

17 Claims, 2 Drawing Sheets

OPTICAL INTERFERENCE COLOR DISPLAY AND OPTICAL INTERFERENCE MODULATOR

CROSS REFERENCE TO RELATED APPLICATIONS

This application claims the priority benefit of Taiwan application serial no. 91137638, filed on Dec. 27, 2002.

BACKGROUND OF THE INVENTION

1. Field of Invention

The present invention relates to an interference color display and an optical interference modulator. More particularly, the present invention relates to an interference color display and an optical interference modulator with a single air gap and color filtering film design.

2. Description of Related Art

At present, lightweight and slim flat panel displays such as liquid crystal display (LCD), organic light-emitting device (OLED) or plasma display panel (PDP) are widely adopted in our everyday life. In particular, liquid crystal panels have become one of the mainstream displays. However, most LCD still has a number of drawbacks including narrow visual angle, moderate response time, need for a color filter for full coloration, and need for a polarizer leading to a poor optical utilization of light source and energy wastage by a back light module.

To improve the operating efficiency of LCD, a new type of LCD called an optical interference display is developed. The optical interference panel comprises an array of optical interference modulators. Each optical interference modulator includes a transparent electrode, a reflective electrode and a support layer for supporting the reflective electrode. Through the support of the support layer, an air gap with a specified thickness is formed between the reflective electrode and the transparent electrode. Light entering from the transparent electrode of the optical interference modulator passes through the air gap and impinges upon the second electrode. Light impinging the second electrode is reflected back to emerge from the modulator through the transparent electrode. Because light passing through air gap of different thickness may result in different degree of optical interference, different colors are produced. For example, red light, green light and blue light can be produced in this way. In addition, the design of the reflective electrode inside the optical interference modulator must integrate with a micro-electromechanical system (MEMS) so that the optical interference modulator can switch between an "on" or an "off" state to illuminate or darken a spot on the panel.

The aforementioned optical interference modulators inside the optical interference display need no additional coloring filter or polarizer for producing a suitable color point and hence able to save some production cost. In addition, each optical interference modulator consumes very little electric power, quick to respond to electrical signals and operates in a bi-stable state. Therefore, the optical interference display is suitable for low power consumption products including most portable device such as mobile phone, personal digital assistant (PDA), electronic book (e-book) and so on.

FIG. 1 is a schematic sectional view of a conventional optical interference color display structure. As shown in FIG. 1, the optical interference color display 100 mainly comprises a transparent substrate 110, a patterned support layer 120, a plurality of first electrodes 130, a plurality of optical films 140 and a plurality of second electrodes 150. In general, the transparent substrate 110 is a glass substrate or a substrate made from a transparent material. The patterned support layer 120 is positioned on the transparent substrate 110 for supporting the edges of the second electrodes 150. The first electrodes 130 are also positioned on the transparent substrate 110. The first electrodes 130 are transparent electrodes fabricated using a material including indium-tin-oxide (ITO). The optical film 140 is positioned on the first electrodes 130. Typically, the optical film 140 is a composite stack having a multiple of alternately positioned high dielectric constant films and low dielectric constant films. The second electrodes 150 are positioned over the first electrodes 130. Through the support of the patterned support layer 120, the second electrodes 150 are positioned over the first electrodes 130. The second electrodes 150 are typically fabricated using a highly reflective metallic material.

In general, a conventional optical interference color panel comprises a plurality of optical interference modulators each having a different air gap thickness. As shown in FIG. 1, the air gap between the second electrode 150 and the first electrode 130 is different for different optical interference modulators. To produce color light, the optical interference modulators are designed to have three different air gap separations d1, d2 and d3. The optical interference modulator with an air gap separation of d1 emits red light; the optical interference modulator with an air gap separation of d2 emits blue light; and, the optical interference modulator with an air gap separation of d3 emits green light. In other words, as light coming from outside penetrates through the transparent substrate 110, the first electrodes 130 and the optical films 140, the light needs to pass through different air gap thickness d1, d2, d3 before arriving at the respective second electrodes 150. Thereafter, the light emerges from the transparent substrate 1100 after reflecting back by the second electrodes 150. Due to different degree of interference at different air gap thickness, red light, green light and blue light are produced.

In a conventional optical interference modulator, the second electrode 150 must be fabricated using a reflective material with good mechanical properties. When the second electrode 150 and the first electrode 130 are coupled to a bias voltage, the second electrode 150 may shift towards the first electrode 130 due to electrostatic attraction. Any movement of the second electrode 150 may lead to a slight variation of the air gap d1, d2 and d3. Through a slight change in the thickness of the air gaps d1, d2, and d3, various optical interference modulators (pixels) within the display can be switched to an "on" or an "off" state.

Accordingly, a conventional optical interference color display utilizes three different types of optical interference modulators each having a different air gap thickness to generate red, green and blue light. However, this type of color display has the following drawbacks:

1. Optical interference modulators having a different air gap thickness must be fabricated separately and hence complicates the production process and increases the production cost.

2. Since optical interference modulators of different air gap thickness are fabricated separately, production time is increased leading to a lower throughput.

3. Separate processing also increase the possibility of having production errors and hence lower product yield.

SUMMARY OF INVENTION

Accordingly, one object of the present invention is to provide an optical interference color display and optical interference modulator each having an identical air gap and a color filtering film so that multi-color or full color effect is produced without having to carry out complicated processing steps.

To achieve these and other advantages and in accordance with the purpose of the invention, as embodied and broadly described herein, the invention provides an optical interference color display. The optical interference color display comprises a color filtering substrate, a patterned support layer, a plurality of first electrodes, a plurality of optical films and a plurality of second electrodes. The patterned support layer and the first electrodes are positioned over the color filtering substrate with the patterned support layer between the first electrodes. The second electrodes is positioned over the first electrodes and supported through the patterned support layer. Therefore, an air gap with identical thickness is produce between every pair of second electrode and first electrode.

This invention also provides an optical interference modulator. The optical interference modulator comprises a substrate, a color filtering film, a patterned support layer, a first electrode, an optical film and a second electrode. The color filtering film is positioned on the substrate. The first electrode and the patterned support layer are positioned on the color filtering film with the patterned support layer located outside the region occupied by the first electrode. The optical film is positioned over the first electrode. The second electrode is positioned over the first electrode and supported through the patterned support layer. An air gap is formed between the second electrode and the first electrode.

According to the embodiment of this invention, the color filtering substrate further includes a substrate, a black matrix and a plurality of color filtering films. The black matrix includes a plurality of grid points and is positioned over the substrate. The color filtering films are positioned on the substrate inside various grid points of the black matrix.

According to the embodiment of this invention, the color filtering films includes, for example, a red filtering film, a green filtering film and a blue filtering film. The substrate is a transparent substrate fabricated using a material including, for example, glass or polymer plastic. The first electrode is a transparent electrode fabricated using a material including, for example, indium-tin-oxide. The second electrode is a metallic electrode fabricated using a material including, for example, molybdenum, molybdenum alloy, chromium, aluminum or aluminum alloy. The optical film comprises, for example, of a plurality of alternately stacked high dielectric constant films and low dielectric constant films.

The optical interference color display and the optical interference modulator are fabricated using a single air gap and color filtering film structure so that the display panel is able to produce multi-colored or fill color effects. Moreover, the identical air gap design simplified production.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

Figure 1:
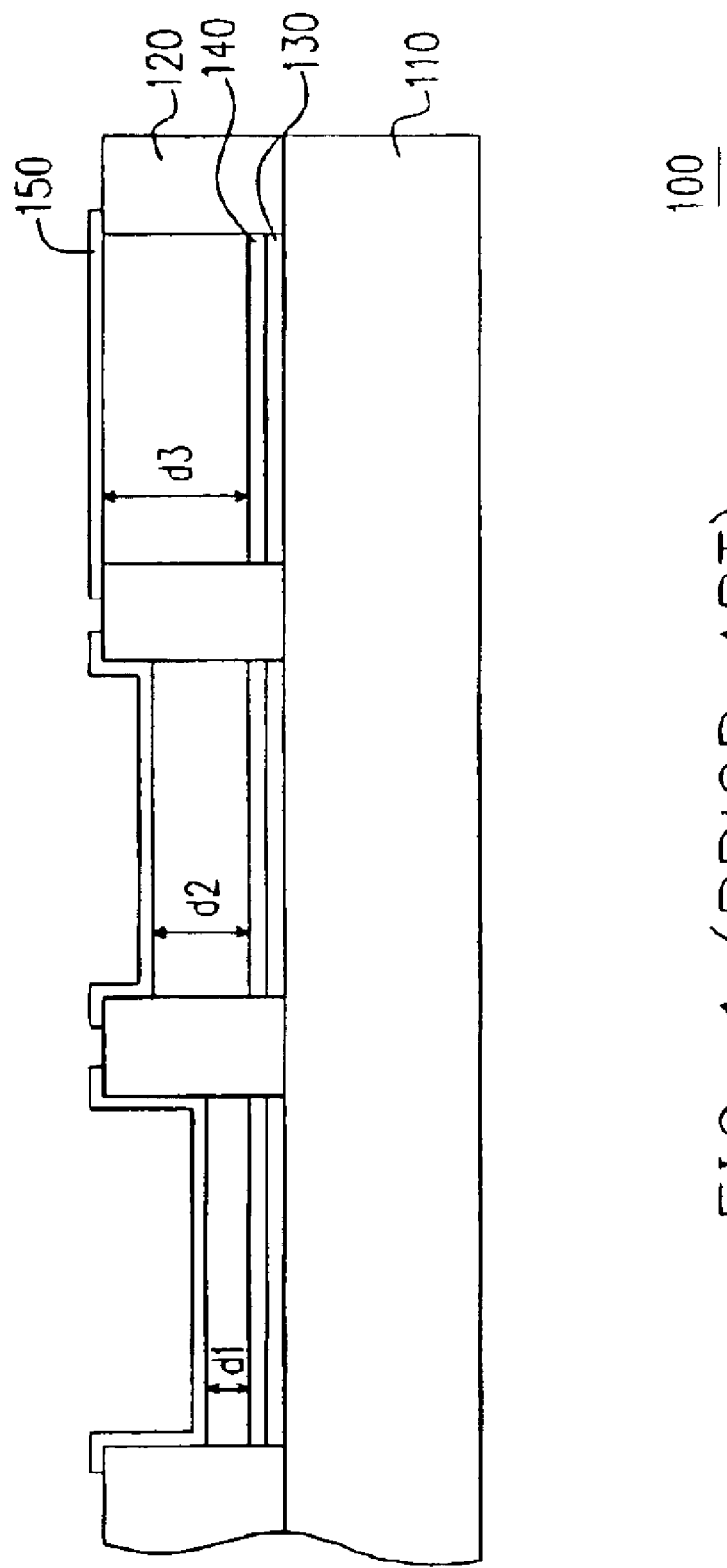
FIG. 1 is a schematic sectional view of a conventional optical interference color display.

Reference will now be made in detail to the present preferred embodiments of the invention, examples of which are illustrated in the accompanying drawings. Wherever possible, the same reference numbers are used in the drawings and the description to refer to the same or like parts.

Figure 2:
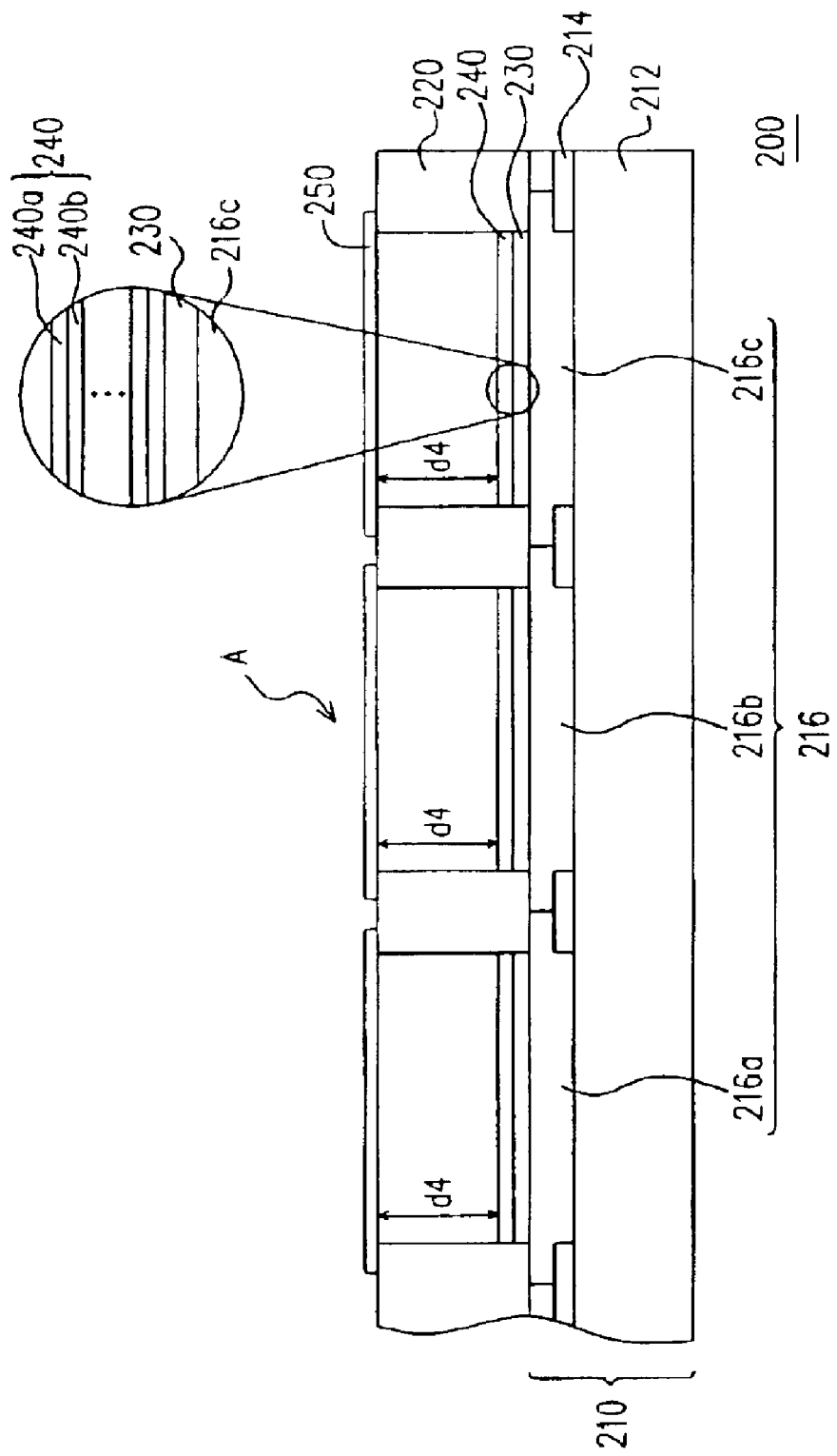
FIG. 2 is a schematic sectional view of an optical interference color display according to one preferred embodiment of this invention.

FIG. 2 is a schematic sectional view of an optical interference color display according to one preferred embodiment of this invention. As shown in FIG. 2, the optical interference color display 200 mainly comprises a color filtering substrate 210, a patterned support layer 220, a plurality of first electrodes 230, a plurality of optical films 240 and a plurality of second electrodes 250.

The color filtering substrate 210 includes a substrate 212, a black matrix 214 and a plurality of color filtering films 216. The substrate is a transparent substrate fabricated using a material including, for example, glass, polymer plastic or other transparent material. The black matrix 214 having a plurality of grid points is positioned over the substrate 212. The color filtering films 216 are positioned on the substrate 212 inside various grid points of the black matrix 214. The color filtering films 216 further includes, for example, a plurality of red filtering films 216a, a plurality of green filtering films 216b and a plurality of blue filtering films 216c. The red filtering films 216a, the green filtering films 216b and the blue filtering films 216c can be arranged in all sorts of ways inside the grid points of the black matrix 214 including, for example, Markov type, triangular type, linear type or four pixel type.

The patterned support layer 220 is positioned on the black matrix 214 above the color filtering substrate 210. The patterned support layer 220 supports the edges of the second electrodes 250 as shown in FIG. 2. The patterned support layer 220 can be, for example, a plurality of cylindrical supports made from resin or other chemically and physically stable material.

The first electrodes 230 are positioned on the color filtering substrate 210. The first electrodes 230 are transparent electrodes fabricated using a material including, for example, indium-tin-oxide or other conductive transparent material.

The optical films 240 are positioned on the first electrodes 230. Typically, each optical film 240 includes at least a first dielectric film 240a and a second dielectric film 240b alternately stacked together. The first dielectric film 240a has a dielectric constant different from the second dielectric film 240b.

The second electrodes are positioned over their respective first electrodes 230 and supported by the patterned support layer 220 so that there is an air gap between each pair of first electrode 230 and second electrode 250. In this embodiment, the second electrodes 250 are reflective metallic electrodes fabricated using a material, for example, molybdenum, molybdenum alloy, chromium, aluminum or aluminum alloy.

In this embodiment, color display effect is achieved through the color filtering substrate 210. Hence, the air gap thickness d4 between the second electrode 250 and the first electrode 230 inside various optical interference modulators A are identical. Therefore, the red filtering film 216a and the overlying optical interference modulator A is able to produce red light. Similarly, the combination of green filtering film 216b and the overlying optical interference modulator A produces green light and the combination of blue filtering film 216c and the overlying optical interference modulator A produces blue light. In other words, light from an external light source will penetrate the color filtering films 216 on the color filtering substrate 210, the first electrodes 230, the optical films 240 and the identical air gaps (thickness d4) to reach the second electrodes 250. Thereafter, as light is reflected by the second electrodes 150 away from the color filtering substrate 210, red, green and blue light at a high saturated level (color purity) are emitted.

Since the second electrode 250 inside the optical interference modulator A is made using a reflective material and has a good mechanical property, the second electrode 250 will move towards the first electrode 230 when a bias voltage is applied between the second electrode 250 and the first electrode 230. Such movement changes the air gap thickness inside the optical interference modulator A. In other words, through the variation in the air gap thickness d4, the on/off states of various optical interference modulators (pixels) inside the display can be set.

In summary, this invention at least includes the following advantages:

1. Since all the optical interference modulators inside the optical interference color display have the same air gap thickness, the optical interference modulators can be fabricated at the same time. Hence, some processing steps are saved and production cost is lowered.

2. Because each optical interference modulator inside the optical interference color display has an identical air gap thickness, repetitive steps can be avoided. In other words, throughput of the production is improved.

3. With a simpler fabrication, overall product yield of the optical interference color display is increased.

4. Because technically mature color filtering films are used, color with very high purity can be produced by the optical interference display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical interference color display, comprising:
   a color filtering substrate comprising a plurality of color filtering films;
   a patterned support layer on the color filtering substrate;
   a plurality of first electrodes on the color filtering substrate, wherein the first electrodes are positioned over the color filtering films;
   a plurality of optical films on the respective first electrodes; and
   a plurality of second electrodes over the respective first electrodes, wherein the second electrodes are supported by the patterned support layer and that the each pair of second electrode and first electrode form an air gap with identical thickness.

2. The color display of claim 1, wherein the color filtering substrate further includes:
   a substrate;
   a black matrix having a plurality of grid points therein, positioned on the substrate and the color filtering films are positioned on the substrate inside the grid points.

3. The color display of claim 1, wherein the color filtering films can be further divided into a plurality of red filtering films, a plurality of green filtering films and a plurality of blue filtering films.

4. The color display of claim 1, wherein the first electrodes include transparent electrodes.

5. The color display of claim 4, wherein the first electrodes are fabricated using a material includes indium-tin-oxide.

6. The color display of claim 1, wherein the second electrodes include metallic electrodes.

7. The color display of claim 6, wherein the second electrodes are fabricated using a material selected from a group consisting of molybdenum, molybdenum alloy, chromium, aluminum and aluminum alloy.

8. The color display of claim 1, wherein the substrate is fabricated using a material including glass or polymer plastic.

9. The color display of claim 1, wherein each optical film further includes:
   at least a first dielectric film; and
   at least a second dielectric film, wherein the second dielectric film and the first dielectric film are alternately stacked and that the second dielectric film has a dielectric constant different from the first dielectric film.

10. An optical interference modulator, comprising:
    a substrate;
    a color filtering film on the substrate;
    a patterned support layer on the color filtering film;
    a first electrode on the color filtering film;
    an optical film on the first electrode; and
    a second electrode above the first electrode supported by the patterned support layer, wherein the second electrode and the first electrode are separated from each other by an air gap.

11. The modulator of claim 10, wherein the color filtering film is selected from a group consisting of a red filtering film, a green filtering film and a blue filtering film.

12. The modulator of claim 10, wherein the first electrode includes a transparent electrode.

13. The modulator of claim 12, wherein the first electrode is fabricated using a material includes indium-tin-oxide.

14. The modulator of claim 10, wherein the second electrode includes a metallic electrode.

15. The modulator of claim 14, wherein the second electrode is fabricated using a material selected from a group consisting of molybdenum, molybdenum alloy, chromium, aluminum and aluminum alloy.

16. The modulator of claim 10, wherein the substrate is fabricated using a material including glass or polymer plastic.

17. The modulator of claim 10, wherein each optical film further includes:
    at least a first dielectric film; and
    at least a second dielectric film, wherein the second dielectric film and the first dielectric film are alternately stacked and that the second dielectric film has a dielectric constant different from the first dielectric film.

* * * * *